United States Patent
Obame Meye et al.

(10) Patent No.: US 12,204,415 B2
(45) Date of Patent: Jan. 21, 2025

(54) SYSTEM FOR STORING DATA REDUNDANTLY, CORRESPONDING METHOD AND COMPUTER PROGRAM

(71) Applicant: Orange, Issy-les-Moulineaux (FR)

(72) Inventors: Pierre Obame Meye, Chatillon (FR); Philippe Raipin Parvedy, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 222 days.

(21) Appl. No.: 17/598,195

(22) PCT Filed: Mar. 27, 2020

(86) PCT No.: PCT/EP2020/058756
§ 371 (c)(1),
(2) Date: Sep. 24, 2021

(87) PCT Pub. No.: WO2020/193761
PCT Pub. Date: Oct. 1, 2020

(65) Prior Publication Data
US 2022/0188201 A1    Jun. 16, 2022

(30) Foreign Application Priority Data

Mar. 28, 2019 (FR) ...................................... 1903250

(51) Int. Cl.
*G06F 11/14* (2006.01)
*G06F 16/2458* (2019.01)
(Continued)

(52) U.S. Cl.
CPC ...... *G06F 11/1464* (2013.01); *G06F 11/1451* (2013.01); *G06F 11/1461* (2013.01);
(Continued)

(58) Field of Classification Search
None
See application file for complete search history.

(56) References Cited

U.S. PATENT DOCUMENTS 8,566,326 B2 * 10/2013 Hu ...................... G06F 11/2097
707/745
9,639,589 B1 * 5/2017 Theimer ................. G06F 21/00
(Continued)

FOREIGN PATENT DOCUMENTS

WO    WO 2014/000578 A1    1/2014

OTHER PUBLICATIONS

Fast Searches for Effective Optimization Phase Sequences.*
International Search Report for International Application No. PCT/EP2020/058756, mailed Jun. 3, 2020.

*Primary Examiner* — Kim T Nguyen (74) *Attorney, Agent, or Firm* — Knobbe, Martens, Olson & Bear, LLP (57) ABSTRACT

A system for storing data redundantly is disclosed. The system includes a plurality of data storage devices, the data being structured in the form of a plurality of records. A first device of the plurality of storage devices stores the records according to a first ordered sequence of records and at least one second device of the plurality of storage devices stores at least one subset of the records according to at least one second ordered sequence of records which is different from the first ordered sequence for the at least one subset.

8 Claims, 4 Drawing Sheets

(51) Int. Cl.
 *G06F 16/248* (2019.01)
 *G06F 16/27* (2019.01)
(52) U.S. Cl.
 CPC ........ *G06F 16/2477* (2019.01); *G06F 16/248* (2019.01); *G06F 16/27* (2019.01); *G06F 2201/80* (2013.01)

(56) References Cited

U.S. PATENT DOCUMENTS

| | | | |
|---|---|---|---|
| 10,599,672 B2* | 3/2020 | Lo | G06F 16/27 |
| 11,068,942 B2* | 7/2021 | Briancon | G06N 3/088 |
| 11,150,964 B1* | 10/2021 | Haberkorn | G06F 16/1734 |
| 11,416,896 B2* | 8/2022 | Briancon | G06N 20/20 |
| 11,860,858 B1* | 1/2024 | McKervey | H04L 9/3297 |
| 11,941,014 B1* | 3/2024 | Das | G06F 16/219 |
| 12,086,150 B2* | 9/2024 | Filippi | G06F 16/2455 |
| 2004/0098390 A1 | 5/2004 | Bayliss et al. | |
| 2017/0147669 A1* | 5/2017 | Lo | G06F 16/27 |
| 2020/0126126 A1* | 4/2020 | Briancon | G06N 20/20 |
| 2022/0044283 A1* | 2/2022 | Briancon | G06F 18/2155 |
| 2022/0188201 A1* | 6/2022 | Obame Meye | G06F 16/248 |
| 2023/0101487 A1* | 3/2023 | Briancon | G06N 3/088 |
| | | | 705/14.66 |
| 2023/0418811 A1* | 12/2023 | Xiong | G06F 16/2477 |

* cited by examiner

SYSTEM FOR STORING DATA REDUNDANTLY, CORRESPONDING METHOD AND COMPUTER PROGRAM

CROSS-REFERENCE TO RELATED APPLICATIONS

This application is filed under 35 U.S.C. § 371 as the U.S. National Phase of Application No. PCT/EP2020/058756 entitled "SYSTEM FOR STORING DATA REDUNDANTLY, CORRESPONDING METHOD AND COMPUTER PROGRAM" and filed Mar. 27, 2020, and which claims priority to FR 1903250 filed Mar. 28, 2019, each of which is incorporated by reference in its entirety.

BACKGROUND

Field

The field of the development is that of the storage of data or information in storage devices, in the form of databases. More specifically, the development relates to a technique for storing data redundantly.

Description of the Related Technology

A database makes it possible to store in structured form, and access by query, a dataset or information in relation to a topic or an activity. Such a storage mostly operates on one or more storage servers, or storage drives, in computerized form.

In order to improve the speed and the reliability of accessing the data contained in a database, it has been proposed to perform a redundant storage of data: the content of the database is fully replicated one or more times, and each of the identical copies of this content is stored on a separate storage medium or server. These storage devices may or may not be geographically distributed.

This type of replication has the following double advantage:
  on the one hand, it improves the availability of the database. Indeed, the existence of a plurality of identical copies of the content of the database make it possible to respond to a larger number of simultaneous queries to access databases;
  on the other hand, it improves the durability of the database, by increasing the resistance to malfunctions that may affect one of the storage devices. Even in the case of failure of one of the devices making it impossible to access the copy that it contains, indeed there is still the possibility of responding to queries to access the databases, by querying another device holding another identical copy of the content of the database.

Although this technique for storing data redundantly is interesting, it may however be optimized according to a plurality of aspects.

First of all, this redundant storage consumes storage resources, both on the energy level, and in terms of storage space. Therefore, there is a need for a technique for storing data redundantly that is more resource economical.

Subsequently, if the redundancy of data makes it possible to improve their availability, the data access performances may also be improved, by reducing the time needed to retrieve them from the storage devices. Therefore, there is a need for a technique for storing data redundantly that has enhanced data access performances.

In other terms, there is a need for a technique for storing data redundantly, which is as sustainable as the techniques of the prior art, but which is more economical, more efficient, while offering increased availability in relation to existing solutions.

SUMMARY OF CERTAIN INVENTIVE ASPECTS

The development meets this need by proposing a system for storing data redundantly, comprising a plurality of data storage devices, the data being structured in the form of a plurality of records. A first device of the plurality of storage devices stores the records according to a first ordered sequence of records and at least one second device of the plurality of storage devices stores at least one subset of the records according to at least one second ordered sequence of records which is different from the first ordered sequence for the subset(s).

Thus, the development is based on a completely novel and inventive approach for storing data redundantly. Indeed, such a technique for storing data redundantly is based, conventionally, on a replication of the content of the database, but on a storage of the replicated content following an order of records different from that of the initial content. Thus, the data are stored differently in the various storage devices. Thus, the data access performances are improved: indeed, the order of storage of the records may influence the time for accessing the data that they contain, depending on the type of the query formulated for accessing the data. Offering a plurality of different ordered sequences of records, on various storage devices, makes it possible to maximize the probabilities of having the ordered sequence of records the most adapted to any type of access query received by the system.

Furthermore, the redundant storage technique according to one embodiment of the development proposes, on at least some of the storage devices of the system, only replicating a portion of the records (for example those that are the most often the subject of access queries), in order to save the resources of the system, by avoiding unnecessarily replicating certain records, for example because they are the subject of few consultation requests. Such a technique for storing data redundantly is therefore more resource economical than the prior techniques.

According to a particular embodiment, each record includes at least two fields in each of which a data item is recorded: the first ordered sequence of records is obtained by sorting the records from data saved in a first of these fields, and the second ordered sequence(s) of records is obtained by sorting the records from data recorded in at least one second of these two fields.

For example a dataset is considered of which each record contains a last name in a first field and a date of birth in a second field. A first storage device stores this dataset according to a first ordered sequence of records obtained by sorting in alphabetical order the last names contained in the first field; a second storage device stores this dataset according to a second ordered sequence of records obtained by an increasing or decreasing sorting of the dates of birth contained in the second field.

It is understood that upon receipt of a query aiming to obtain all of the records associated with individuals whose last name starts with the letter A, the access to the first storage device will offer an enhanced performance in relation to the second storage device, in terms of time for accessing the data, insofar as the access to the data will be carried out by sequential reading on the storage drive. On the other hand, in the event of access to the records stored by the second storage device, wherein the records are sorted by date of birth, it will be necessary, in order to obtain the requested data, to browse the entire database of records if no index exists, which is much slower; if an index exists, the requested data will be obtained by random readings on the drive, which are, by nature, much slower than sequential readings.

The ordered sequence of records proposed by the second storage device, namely a sorting by date of birth of the records, will on the other hand be well adapted to rapidly obtain the data in response to a query aiming to determine all of the records associated with individuals born between 1990 and 2000.

Thus, according to a particular aspect, such a storage system comprises a database management system configured to determine a storage device to be queried, from the first and the second storage devices, depending on a data query received by the system, in order to optimize a time for retrieving the requested data.

Such a database management system (or DBMS) analyses the query received and points towards the storage device of the system the ordered sequence of records of which is the most adapted to rapid retrieval of the requested data. Thus, the stored data access performances are improved.

According to one aspect, such a database management system is also configured to determine the subset(s) of records to be stored in the second storage device(s), depending on a number and/or a frequency of queries concerning the records of the subset.

For example, for a database containing records relating to football players, the DBMS may choose to replicate, on a storage device, only the records relating to the ten biggest stars of the sports discipline, who are the most often the subject of queries. The necessary storage space is advantageously restricted in relation to that needed for a full replication of the database; the availability of the data of the base however remains high, insofar as most of the queries received concern this subset of football stars.

According to yet another aspect, such a database management system is also configured to determine a number of storage devices of the plurality of storage devices wherein to store the records and associated different ordered sequences of records, depending on a type and/or a volumetry of queries likely to be received.

Thus, the fields of the records on which the sorting is operated in order to construct ordered sequences of records, as well as the number of replicas of the records to be stored on various storage devices, are selected statically, in relation to the types of queries expected and their estimated volumetry.

According to yet another aspect, such a database management system is also configured to transmit a command for storing at least one subset of records according to an ordered sequence of records to a storage device of the plurality of storage devices, depending on a type and/or a volumetry of queries received.

Thus, the selection of fields on which the sorting is operated and the number of replicas of the records is operated dynamically, which makes it possible to improve the availability and the performance of the storage system on at least one portion of the data contained in the system, and this, selectively during the life cycle of the data and of the database. This is particularly advantageous in relation to the storage systems of the prior art, according to which the replica or copy level is global for all of the data recorded.

The development also relates to a system for storing data redundantly, in a plurality of data storage devices, the data being structured in the form of a plurality of records. Such a storage method comprises:

storing records in a first device of the plurality of storage devices according to a first ordered sequence of records;

storing, in at least one second device of the plurality of storage devices at least one subset of the records according to at least one second ordered sequence of records which is different from the first ordered sequence for this or these sub set(s).

According to a particular aspect, each record including at least two fields in each of which a data item is recorded, the first ordered sequence of records is obtained by sorting the records from data saved in a first field, and the second ordered sequence(s) of records is obtained by sorting the records from data recorded in at least one second field.

According to yet another particular aspect, upon receipt of a data query, such a storage method comprises a step of determining a storage device to be queried, from the first and the second storage device(s), depending on the data query received, in order to optimize a time for retrieving said requested data.

The development also relates to a computer program product comprising program code instructions for implementing a method such as previously described or executing the functionalities of a system such as previously described, when it is executed by a computer.

The aim of the development is also a computer-readable recording medium whereon a computer program is recorded comprising program code instructions for executing the steps of the storage method according to the development such as described above.

Such a recording medium may be any entity or device capable of storing the program. For example, the medium may include a storage means, such as a ROM, for example a CD ROM or a microelectronic circuit ROM, or also a magnetic recording means, for example a USB key or a hard drive.

On the other hand, such a recording medium may be a transmissible medium such as an electrical or optical signal, which may be routed via an electrical or optical cable, by radio or by other means, so that the computer program that it contains can be executed remotely. The program according to the development may in particular be downloaded on a network for example the Internet network.

Alternatively, the recording medium may be an integrated circuit wherein the program is incorporated, the circuit being adapted to execute or to be used in the execution of the aforementioned display control method.

The aforementioned corresponding storage method and computer program have at least the same advantages as those conferred by the storage system according to the present development.

BRIEF DESCRIPTION OF THE DRAWINGS

Other aims, features and advantages of the development will become more apparent upon reading the following description, given by way of simple illustrative, and non-limiting example, in relation with the figures, wherein.

DETAILED DESCRIPTION OF CERTAIN ILLUSTRATIVE EMBODIMENTS

The general principle of the development is based on storing data redundantly, i.e. storing a plurality of copies of the same database on a plurality of separate storage devices, but wherein the various copies of the database are not strictly identical, but of different forms, particularly in terms of order of the records of the base on the storage device.

According to a secondary aspect, on at least one device of the storage system, only one copy of the most frequently requested data is stored, and not the entire database.

Figure 1:
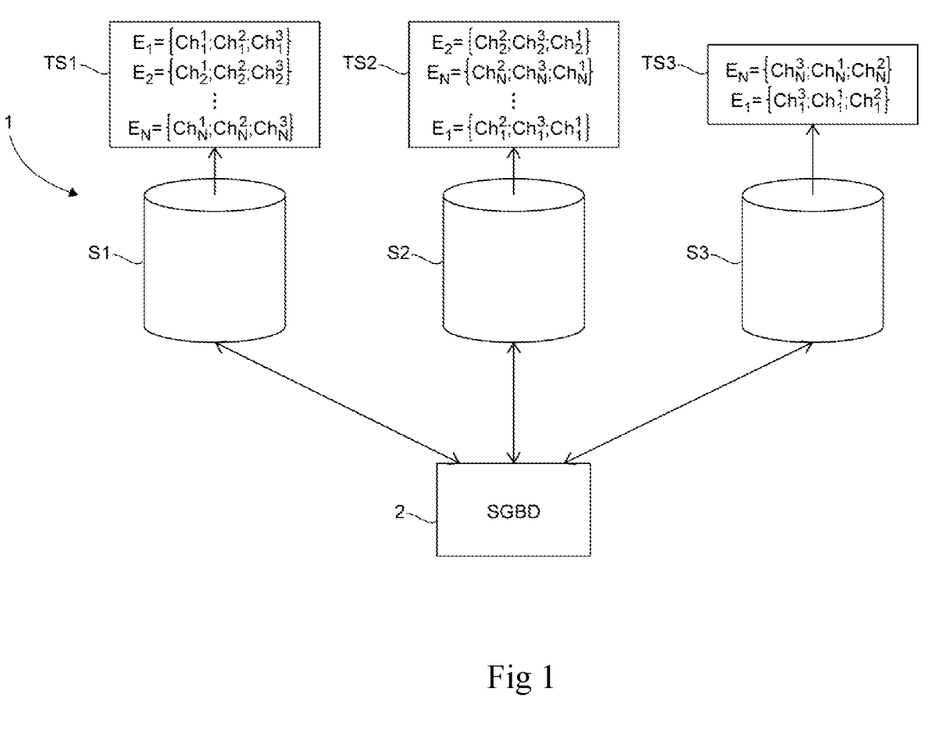
FIG. 1 presents a general block diagram of a system for storing data redundantly according to one embodiment of the development.

It is now presented, in relation to FIG. 1, a general block diagram of a system for storing data redundantly 1 according to one embodiment of the development.

Such a storage system 1 comprises a plurality of storage devices referenced S1 to S3, of which only three examples have been shown by way of illustration in FIG. 1. The number of storage devices is of course not limited to three, and any other number of storage devices greater than or equal to two may also be envisaged. In particular, the higher the volume of data to be stored, the more frequently requested the access to the data, the higher the number of fields of each record, and the more advantageous it is to have a significant number of separate storage media, this, in order to improve the availability and the durability of the database.

The storage devices S1 to S3 may be located in the same data center, or be geographically distributed, if applicable located in different countries.

Furthermore, such storage devices may be storage servers, hard drives, flash memories, etc.

A database management system, or DBMS, 2 makes it possible to handle the content of the databases stored in the storage devices S1 to S3. Such a database management system 2 is in the form of a set of software applications, and is used to perform ordinary operations such as searching for, adding or deleting records (Create, Read, Update, Delete acronym CRUD), handling indexes, creating or copying databases.

For example, a database containing a set of records referenced $E_1$ to $E_N$ is considered. Each of these records $E_i$ comprises a plurality of fields (three in the example of FIG. 1), noted $Ch_i^1$, $Ch_i^2$ and $Ch_i^3$. For example, each record $E_i$ corresponds to an individual, whose last name is recorded in a first field $Ch_i^1$, whose first name is contained in a second field $Ch_i^2$, and whose date of birth is stored in a third field $Ch_i^3$.

The first storage server S1 is associated with a first storage type TS1, according to which the records $E_1$ to $E_N$ are ordered in increasing order of the values of the data contained in the first field $Ch_i^1$, that being in this example in alphabetical order of the last name. Thus, the first storage type TS1 corresponds to an ordered sequence $(E_1, E_2, \ldots, E_N)$.

The second storage server S2 is associated with a second storage type TS2, according to which the records $E_1$ to $E_N$ are ordered in increasing order of the values of the data contained in the second field $Ch_i^2$, that being in this example in alphabetical order of the first name. Thus, the second storage type TS2 corresponds for example to an ordered sequence $(E_2, E_N, \ldots, E_1)$.

All of the records $E_1$ to $E_N$ are stored in each of the two servers S1 and S2, which makes it possible to ensure the durability of the storage system: indeed, in the event of malfunction of one of the two servers, for example S1, the data remain accessible by sending a query to the server S2.

However, it is understood that a query aiming to obtain a list of individuals whose family name starts with the letter A will be processed more rapidly if the DBMS 2 sends it to the first server S1, which offers a storage type TS1 in alphabetical order of the last name: a simple sequential reading of the records indeed makes it possible to rapidly extract from the storage server S1 the list of individuals requested. The response time is therefore optimized.

On the other hand, if the query aims to obtain a list of individuals whose first name starts with the letter A, and that it is sent by the DBMS 2 to the first storage server S1, its processing will not be optimized.

Indeed, if no index exists on the storage server S1, it is necessary to browse the entire ordered list of records $(E_1, E_2, \ldots, E_N)$ in order to extract therefrom those of which the value of the second field $Ch_i^2$ starts with the letter A. It is reminded that an index may be defined as a batch of data intended to accelerate the data search operations. The structure of the index includes values associated with pointers where each pointer makes it possible to find the data that has this value.

Therefore, if an index exists on the storage server S1, it makes it possible to point on the fields $Ch_i^2$ the value of which starts with the letter A. However, the access to the corresponding records requires operating random readings on the storage drive S1, which by nature are much slower than the sequential readings.

Upon receipt of a query aiming to obtain a list of individuals whose first name starts with the letter A, the database management system DBMS 2 may advantageously send it to the second storage server S2, in order to optimize the processing time thereof: the list requested may be obtained rapidly by sequential reading of the content of the copy of the database stored on the second storage server S2.

The storage system of FIG. 1 moreover comprises a third storage medium S3, on which is stored only a subset of the records of the database, for example $E_N$ and $E_1$. For example, this storage follows a storage type TS3 that consists of classifying the records in increasing order of the value of the data contained in the third field $Ch_i^3$, that being according to an ordered sequence $(E_N; E_1)$ in this example.

The subset $(E_1, E_N)$ of records to be stored on the server S3 has been selected because it concerned the most frequently requested records (observation, during operation of the storage system 1, of a high volumetry of queries concerning these records), or of which it was expected that they are the most frequently the subject of queries, upon initialization of the storage system 1. Likewise, the selection of the storage type TS3 may result from a static selection, in relation to the expected types of queries, upon initialization of the storage system 1. It may also result from a dynamic selection, during the life cycle of the data, following an observation of a high frequency of queries concerning the third field of the records.

It is now presented in more detail, in relation to the following figures, the steps of storing a record in the storage system 1 of FIG. 1, and of reading this record, in response to an access query.

Figure 2:
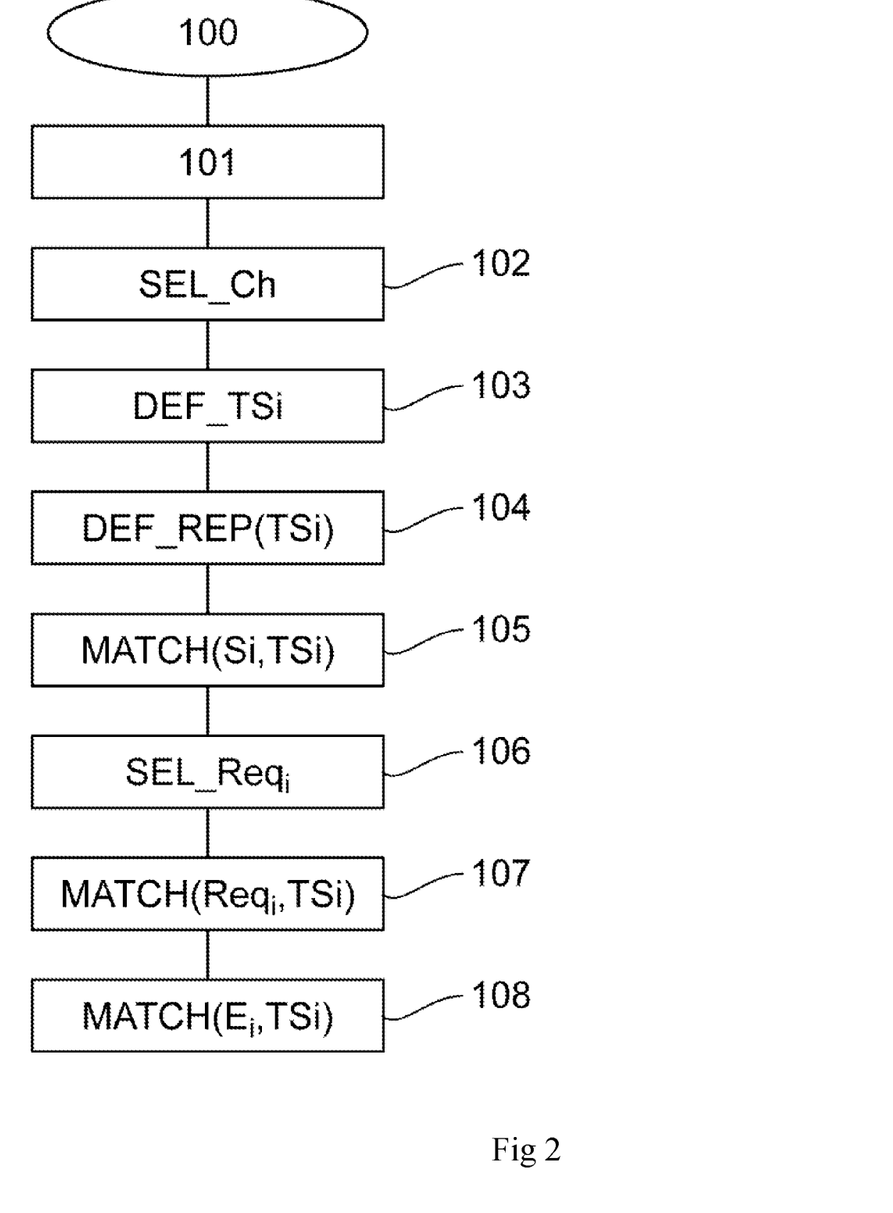
FIG. 2 illustrates in organizational chart form the various steps of the phase for initializing the redundant storage system of FIG. 1.

A phase of configuration, or of initialization of the redundant storage system 1 is necessary, before being able to process any query. This initialization is illustrated by the method of FIG. 2.

The step referenced 100 corresponds to the creation of the database in the redundant storage system 1. During a step referenced 101, the data model/scheme of the base is created, namely the type of records $E_i$, the types of fields $Ch_i^j$ that they consist of, etc. . . .

During a step SEL_Ch referenced 102, the fields $Ch_i$ of the data scheme are selected on which the storage optimizations will be carried out. Indeed, all of the fields of the records do not necessarily have the same importance, and it may be advantageous to provide copies of the database sorted according to the value of some of the fields of the records, but not some others, which are the subject of less frequent queries.

During a step DEF_$TS_i$ referenced 103, the storage types $TS_i$ are defined in relation to the data fields $Ch_i$ selected previously during step 102. A default storage type may also be defined.

During step DEF_REP($TS_i$) 104, the REP replication factor is defined according to the storage type $TS_i$. For example, it may be determined that it is necessary to have three copies of the database according to the storage type TS2, two copies of the base according to the storage type TS3, but only one copy according to the storage type TS1.

Subsequently (step MATCH($S_i,TS_i$) 105) storage types $TS_i$ are allocated to the various storage media $S_i$ (servers, hard drives, flash memories, etc.) that will store the data of the database. This allocation may be carried out randomly if the storage media $S_i$ are identical or by taking into account their specificities and data to be stored. For example, the most efficient storage media $S_i$ may be allocated the storage types $TS_i$ likely to require the highest performance. This step may be based on a profiling of the data and of the queries.

During a step SEL_$Req_i$ referenced 106, the type of queries $Req_i$ to be optimized are defined by taking into account the fields $Ch_i$ to be optimized. All or some of the subsets of the queries $Req_i$ may be declared as being to be optimized.

During the step referenced 107 MATCH ($Req_i$, $TS_i$), the matching of the types of queries $Req_i$ with the storage types $TS_i$ is carried out. Then, during the step referenced 108 MATCH ($E_i$, $TS_i$), the matching of the records $E_i$ with the storage types $TS_i$ is carried out.

All of the steps 100 to 108 described above may be performed when we have more or less in-depth knowledge of the data to be stored and of the queries that will be played on the database. In the opposite case, it is possible to, upon initialization of the system for storing data redundantly, only carry out step 100 of creating the database, on the basis of determining a default storage type. During the life cycle of the database, by an analysis or learning process, and based on knowledge that will be extracted by this process, the steps referenced 101 to 108 may be implemented, one or more times, for example by successive iterations, in order to adapt the storage in relation to the activity observed on the database.

Figure 3:
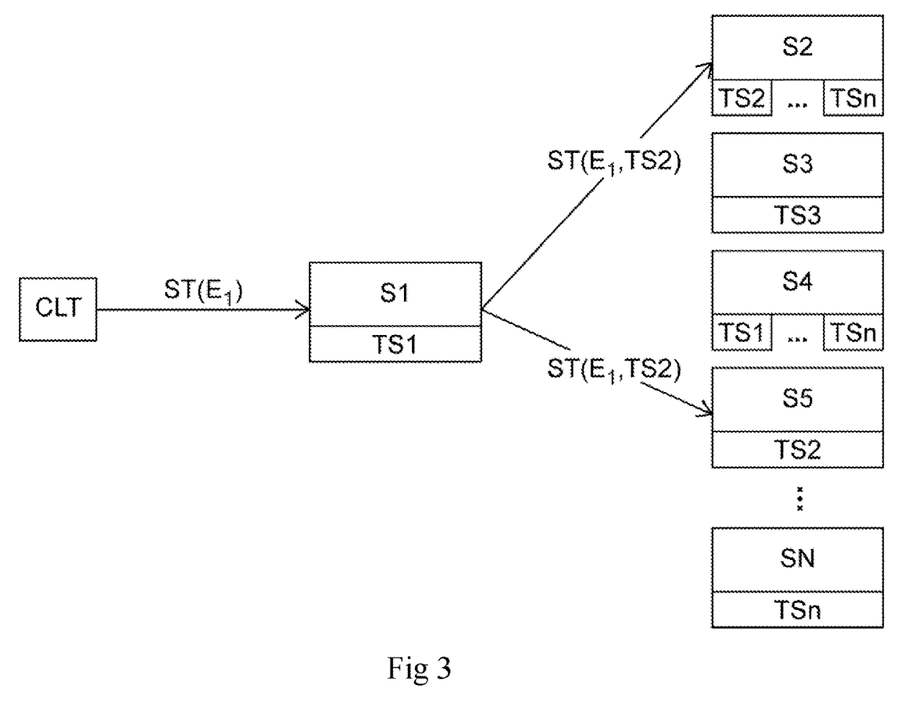
FIG. 3 describes the process for storing a record in a system for storing data redundantly according to one embodiment of the development.

The diagram of FIG. 3 illustrates the process for storing a record in a system for storing data redundantly according to one embodiment of the development.

Such a storage system comprises N storage servers or media referenced S1 to SN. A client CLT sends to the first storage server S1 a record $E_1$ that must be stored in memory in the database. This record $E_1$ may consist of a plurality of fields $Ch_1^1$, $Ch_1^2$, $Ch_1^3$, $Ch_1^4$, etc. This sending takes the form of an ST($E_1$) command, sent to the server S1, which may be a data storage server, or a DBMS 2 type server, which is in charge of distributing the record queries to the suitable storage servers. In the example of FIG. 3, it is considered that the server S1 is also a data storage server, according to the storage type TS1.

Upon receipt of the record $E_1$, the server S1 analyses it, based on information that it has previously stored in memory relating to the matching of the records and of the storage types, and deduces therefrom that this record $E_1$ must be associated with a storage type TS2. This analysis may, in one embodiment, be performed by a dedicated metadata server.

The server S1 then sends (ST($E_1$, TS2)) the record $E_1$ to the servers S2 and S5, which are the storage servers storing replicas of the database according to the storage type TS2.

As illustrated in FIG. 3, a storage server Si may store in memory a plurality of copies of the database, according to a plurality of separate storage types. Thus, the server S2 manages copies of the database according to the storage types TS2 to TSn and the storage server S4 stores copies of the database according to the storage types TS1 to TSn. On the other hand, the server S3 only stores one copy of the database, corresponding to the ordered sequence of records TS3; likewise, the servers S5 and SN only keep one copy of the database, respectively according to the storage type TS2 and TSn.

In the example of FIG. 3, the server S1, which may be the database management system DBMS 2, therefore only sends the query for storing the record E1 to the servers S2 and S5 capable of managing the storage type TS2.

Figure 4:
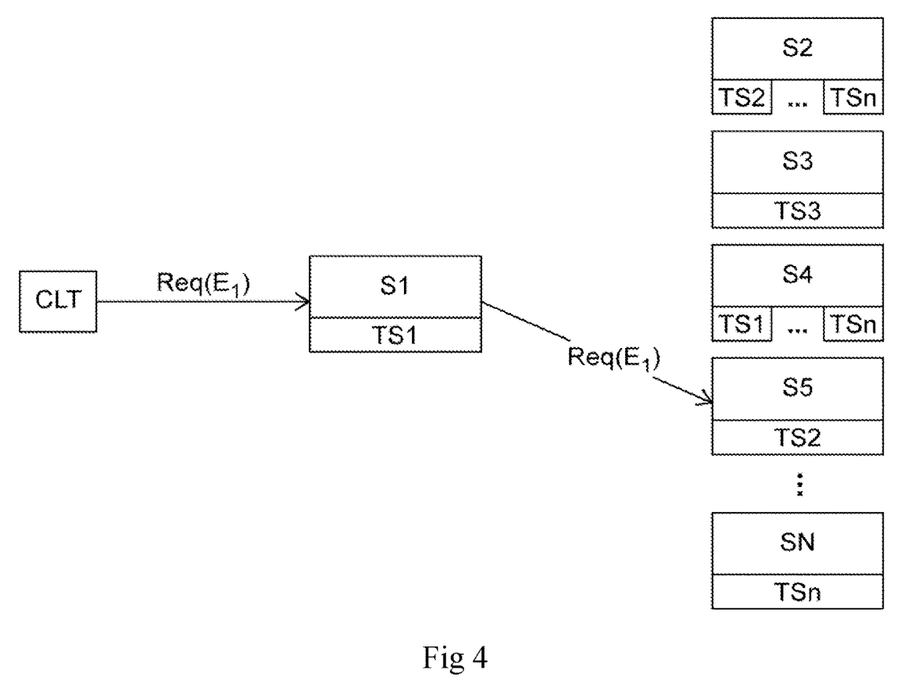
FIG. 4 presents the process for reading a record in a system for storing data redundantly according to one embodiment of the development.

The diagram of FIG. 4 illustrates the principle for reading a record previously stored in a system 1 for storing data redundantly according to one embodiment of the development.

The client CLT sends to the server S1 a query Req($E_1$) for reading the record $E_1$. As previously, this server S1 may be a server for storing the database, or a simple server in charge of pointing the queries towards the suitable storage servers: it therefore acts as DBMS 2. Upon receipt of the query Req($E_1$), the server S1 operates a matching of the record $E_1$ and of the storage type TS2, and determines a storage server from which it will be able to rapidly extract the record $E_1$. This matching may be performed based on information available for the server S1, such as the order of the fields in E1 and the order of the fields in the various storage types, or be performed by a dedicated metadata server.

In the example of FIG. 4, the server S1 determines that the optimum performances in terms of time for processing the query will be achieved by sending the query Req($E_1$) for reading $E_1$ to the server S5. Therefore, it sends Req($E_1$) to the server S5.

By simple sequential reading of the records stored according to the ordered sequence corresponding to the storage type TS2, the server S5 may rapidly extract the data relating to the record E1 from its storage space, and send it in response to the client CLT, via the server S1.

Thus, the performance of the redundant storage system 1 is optimized, by easily identifying the server associated with the storage type the most adapted to the nature of the query of the client.

It will be noted that, if a single storage type TS was defined in the redundant storage system of FIG. 4, or if the query Req($E_1$) received from the client CLT had not been allocated beforehand to a given storage type TSi, the selection, by the server S1, of the storage device Si to which to send the query may be carried out randomly, or by taking into account the load of the various storage media S1 to SN. Thus, selecting the storage medium having the lowest load also makes it possible to optimize the time for processing the query, and therefore to improve the performances of the system 1.

The system for storing data redundantly described above in its various embodiments is particularly advantageous for managing large size databases, typically from billions of records, and has the following advantages:

the possibility of storing in different ways the various replicas of the database, by optimizing the order of storage of the records by taking into account the use that is made of the databases;

the improvement of performances in a selective way on all of the data, by only replicating highly requested data;

the saving of resources by only increasing the level of replication for the data that are the most requested by queries;

the possibility of adapting the level of replication on demand, dynamically, on the stored data, by learning.

Figure 5:
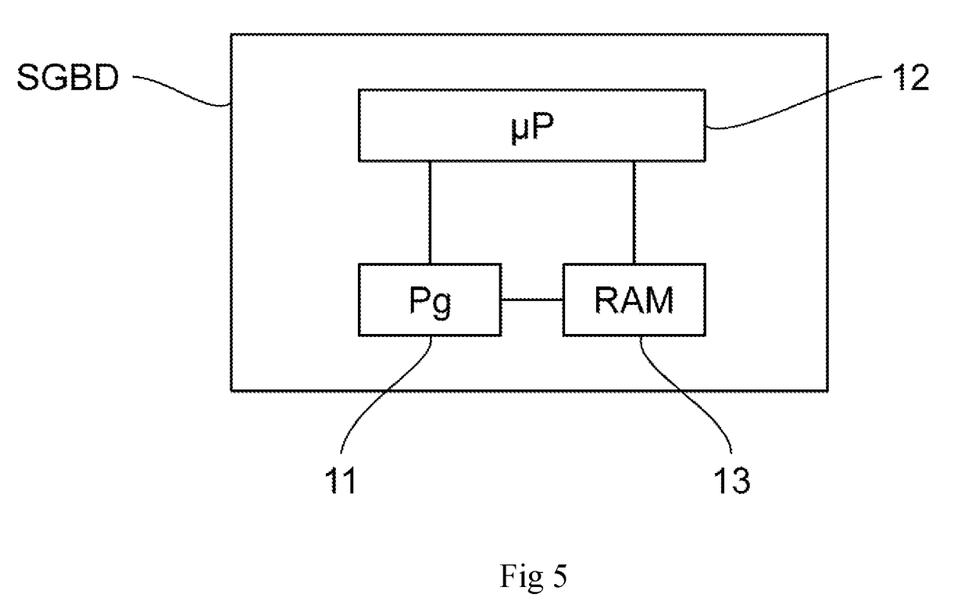
FIG. 5 presents the hardware structure of a database management system DBMS according to one embodiment of the development.

It is now presented, in relation to FIG. 5, the hardware structure of a database management system DBMS 2 according to one embodiment of the development.

The term management system may correspond to a software component as well as a hardware component or a set of software and hardware components, a software component itself corresponding to one or more computer programs or subprograms or more generally to any element of a program capable of implementing a function or a set of functions.

More generally, such a database management system DBMS comprises a random access memory 13 (for example a RAM memory), a processing unit 12 equipped for example with a processor, and controlled by a computer program, stored in a read-only memory 11 (for example a ROM memory or a hard drive). Upon initialization, the code instructions of the computer program are for example loaded into the random access memory 13 before being executed by the processor of the processing unit 12. The random access memory 13 particularly contains the rules for matching the query types with the storage types, the rules for matching the records with the storage types, a description of the storage types and of the order of storage of the records that are associated with them, etc. The processor of the processing unit 12 controls the analysis of the queries and of the records received, in order to identify the storage types that correspond to them, and the storage media managing these storage types, to whom to send the records to be stored, or the queries to access records.

FIG. 5 only illustrates a particular way, among several possible ways, to implement the database management system DBMS 2, so that it performs the steps of the method detailed above, in relation to FIG. 1 to FIG. 4 (in any one of the various embodiments, or in a combination of these embodiments). Indeed, these steps may be performed indifferently on a reprogrammable calculation machine (a PC computer, a DSP processor or a microcontroller) executing a program comprising a sequence of instructions, or on a dedicated calculation machine (for example a set of logic gates such as a FPGA or an ASIC, or any other hardware module).

In the case where the database management system DBMS 2 is produced with a reprogrammable calculation machine, the corresponding program (that is to say the sequence of instructions) may be stored in a removable storage medium (such as for example a floppy disk, a CD-ROM or a DVD-ROM) or not, this storage medium being partially or totally readable by a computer or a processor.

The invention claimed is:

1. A system for storing data redundantly, comprising a plurality of data storage devices, the data being structured in the form of a plurality of records, wherein a first device of the plurality of storage devices stores the records according to a first ordered sequence of records and wherein at least one second device of the plurality of storage devices stores at least one subset of the records according to at least one second ordered sequence of records which is different from the first ordered sequence for the at least one subset, wherein the storage system comprises a database management system configured to determine a storage device to be queried, from the first and the at least one second storage devices, depending on a data query received by the system, in order to optimize a time for retrieving requested data.

2. The storage system according to claim 1, wherein each record includes at least two fields in each of which a data item is recorded, wherein the first ordered sequence of records is obtained by sorting the records from data saved in a first of the at least two fields, and the at least one second ordered sequence of records is obtained by sorting the records from data recorded in at least one second of the at least two fields.

3. The storage system according to claim 1, wherein the database management system is also configured to determine the at least one subset of records to be stored in the at least one second storage device, depending on a number and/or a frequency of queries concerning the records of the subset.

4. The storage system according to claim 1, wherein the database management system is also configured to determine a number of storage devices of the plurality of storage devices wherein to store the records and associated different ordered sequences of records, depending on a type and/or a volumetry of queries likely to be received.

5. The storage system according to claim 1, wherein database management system is also configured to transmit a command for storing at least one subset of the records according to an ordered sequence of records to a storage device of the plurality of storage devices, depending on a type and/or a volumetry of queries received.

6. A method of storing data redundantly, in a plurality of data storage devices, the data being structured in the form of a plurality of records, the method comprising:

storing the records in a first device of the plurality of storage devices according to a first ordered sequence of records;

storing, in at least one second device of the plurality of storage devices, at least one subset of the records according to at least one second ordered sequence of records which is different from the first ordered sequence for the at least one subset, wherein, upon receipt of a data query, determining a storage device to be queried, from the first and the at least one second storage devices, depending on the data query received, in order to optimize a time for retrieving requested data.

7. The storage method according to claim 6, wherein each record includes at least two fields in each of which a data item is recorded, wherein the first ordered sequence of records is obtained by sorting the records from data saved in a first of the at least two fields, and the at least one second ordered sequence of records is obtained by sorting the records from data recorded in at least one second of the at least two fields.

8. A non-transitory computer storage medium, storing instructions of a computer program, causing implementing the method according to claim 6, when the program is executed by a processor.

* * * * *